United States Patent [19]

Chane-Ching et al.

[11] Patent Number: 5,064,628
[45] Date of Patent: * Nov. 12, 1991

[54] NOVEL CERIC OXIDES AND PREPARATION THEREOF

[75] Inventors: Jean-Yves Chane-Ching, Paris; Jean-Luc Le Loarer, La Rochelle; Patrick Dupuis, Paris, all of France

[73] Assignee: Rhone-Poulenc Chimie, Courbevoie, France

[*] Notice: The portion of the term of this patent subsequent to Aug. 22, 2006 has been disclaimed.

[21] Appl. No.: 485,852

[22] Filed: Feb. 22, 1990

Related U.S. Application Data

[63] Continuation of Ser. No. 30,135, Mar. 26, 1987, abandoned.

[30] Foreign Application Priority Data

Mar. 26, 1986 [FR] France ................................ 86 04347

[51] Int. Cl.$^5$ .......................... B01J 23/10; C01F 17/00
[52] U.S. Cl. ...................................... 423/263; 502/304
[58] Field of Search ............... 423/21.1, 263; 502/304; 252/315.01

[56] References Cited

U.S. PATENT DOCUMENTS

| 3,761,571 | 9/1973 | Woodhead | 423/263 |
| 4,661,330 | 4/1987 | Chane-Ching et al. | 423/263 |
| 4,663,137 | 5/1987 | Chane-Ching et al. | 423/263 |
| 4,859,432 | 8/1989 | David et al. | 423/21.1 |

FOREIGN PATENT DOCUMENTS

| 2559755 | 8/1985 | France . | |
| 145853 | 1/1981 | German Democratic Rep. | 423/263 |

OTHER PUBLICATIONS

Chemical Abstracts, vol. 96, 1961, 95:189463d, "Cerium Dioxide".

*Primary Examiner*—Jeffrey E. Russel
*Attorney, Agent, or Firm*—Burns, Doane, Swecker & Mathis

[57] ABSTRACT

Provided is a ceric oxide having a specific surface of at least 85 m$^2$/g after calcination between 350° and 550° C., and being further characterized in that it has a pore volume of at least 0.15 cm$^3$/g and a median pore diameter greater than 50 Å. The ceric oxide is prepared by destabilizing an aqueous colloidal dispersion of a cerium (IV) compound by the addition of base thereto, separating the precipitate which results and subjecting it to a heat treatment.

49 Claims, No Drawings

NOVEL CERIC OXIDES AND PREPARATION THEREOF

This application is a continuation of application Ser. No. 07/030,135, filed Mar. 26, 1987, now abandoned.

Copending applications, Ser. No. 07/030,133, filed Mar. 26, 1987 and Ser. No. 07/030,134, filed Mar. 26, 1987, are both filed concurrently herewith and are both assigned to the assignee hereof.

BACKGROUND OF THE INVENTION

1. Field of the Invention

The present invention relates to ceric oxides exhibiting novel morphological characteristics, and to a process for the preparation thereof.

In the following description of the invention, the term "a specific surface" refers to the B.E.T. specific surface as determined by the BRUNAUER-EMMETT-TELLER method described in the *Journal of the American Chemical Society*, 1938, 60, 309.

2. Description of the Prior Art

Ceric oxide, by itself or in a mixture of other metal oxides, has been used as a catalyst, and in particular for the synthesis of methanol [C. R. Seances Acad. Sci, Ser. 2. 292 (12) 883–5 (1981)] and in processes for the treatment of residual gases [Japanese Application No. 76/62 616].

To realize good catalytic reactivity, it is generally desirable to utilize a ceric oxide having the largest possible specific surface.

French Patent No. 2,559,754 describes the preparation of a ceric oxide having a specific surface of at least $85 \pm 5$ m$^2$/g, which is obtained after calcination between 350° and 450° C. Preferably, the specific surface is between 100 and 130 m$^2$/g after calcination at a temperature in the range from 400° to 450° C.

The method of preparation comprises the hydrolysis of an aqueous solution of ceric nitrate in a nitric acid medium, followed by the separation of the precipitate obtained, washing by means of an organic solvent, optional drying, and calcination between 300° and 600° C. The ceric oxide obtained exhibits a large specific surface but low porosity. The micropores have a median diameter between 10 and 20 Å and a pore volume on the order of 0.02 cm$^3$/g.

French Patent No. 2,559,755 describes a method of preparing a ceric oxide having a specific surface of at least $85 \pm 5$ m$^2$/g after calcination between 350° and 500° C., and more specifically, a specific surface of between 150 and 180 m$^2$/g after calcination between 400° and 450° C. The method of preparation consists of precipitating a basic ceric sulfate by reacting an aqueous solution of ceric nitrate and an aqueous solution containing sulfate ions, separating the precipitate obtained, washing it with an ammonia solution, optionally drying it, and then calcining it at a temperature between 300° and 500° C. The ceric oxide prepared in this manner has a large specific surface and a wide size range in pores, with the pores ranging from 10 to 200 Å, and a pore volume of approximately 0.15 cm$^3$/g. The product further contains a quantity of residual sulfate ions, wherefore it may be used only selectively in the field of catalysis.

SUMMARY OF THE INVENTION

An object of the present invention is to provide ceric oxides with a high specific surface and with novel characteristics of porosity, which is in contrast to the products described in the literature.

Briefly, the present invention relates to a ceric oxide having a specific surface of at least 85 m$^2$/g after calcination between 350° and 550° C., being further characterized in that it has a pore volume of at least 0.15 cm$^3$/g and a median pore diameter greater than 50 Å.

The specific surfaces cited are measured on a product exposed to the given calcining temperatures for at least 2 hours. The pore volume and the size of the pores are determined, as is the specific surface, by the BET method.

The present invention also relates to a process for the preparation of such ceric oxides comprising the steps of destabilizing an aqueous colloidal dispersion of a cerium (IV) compound by the addition of base thereto, separating the precipitate which results and subjecting it to a heat treatment.

DETAILED DESCRIPTION OF THE PREFERRED EMBODIMENTS OF THE INVENTION

In a preferred embodiment, the ceric oxide according to the present invention has specific surface of at least 100 m$^2$/g after calcination between 350° and 500° C.

In a more preferred embodiment, the ceric oxide according to the present invention has a specific surface of from 100 to 150 m$^2$/g after calcination at a temperature between 350° and 500° C., and preferably between 400° and 450° C.

The pore volume of the ceric oxide of the present invention generally varies between 0.15 and 0.3 cm$^3$/g.

A further preferred characteristic of the ceric oxide according to the present invention is that it ca be of a high purity, i.e., of up to 99%, depending on the choice of base, e.g., ammonia, used during its preparation.

In another embodiment of the present invention, the ceric oxide has a specific surface of at least 85 m$^2$/g after calcination between 350° and 550° C., and is further characterized by a pore volume higher than 0.15 cm$^3$/g, a median diameter of pores between 50 and 200 Å and a single mode size distribution of the pores. Such a ceric oxide according to the present invention has uniform porosity.

Generally, the size of the pores expressed by the median diameter ($d_{50}$) varies between 50 to 200 Å, and more preferably between 80 to 150 Å. The median diameter is defined as that diameter for which all smaller pores constitute 50% of the total pore volume ($v_p$).

The standard deviations $e_1$ and $e_2$ as defined by the ratios $$(d_{84} \cdot v_p)/(d_{50} \cdot v_p) \text{ and } (d_{50} \cdot v_p)/(d_{16} \cdot v_p)$$

are within a range from 1.0 to 2.0.

X-ray diffraction analysis shows that the ceric oxide of the present invention has a crystalline phase of the CeO$_2$ type with a lattice parameter ranging from 5.41 to 5.44 Å and a proportion of crystallization between 50 and 80%. In the crystallized portion, the size of the crystallites of ceric oxide obtained after calcination at 300° C. varies between 50 and 100 Å.

In another embodiment of the present invention, a ceric oxide is provided having a specific surface of at least 85 m$^2$ g after calcination between 350° and 550° C., being further characterized in that it has a pore volume greater than 0.15 cm$^3$/g, and a dual population distribution of pores, with the median diameter of the micropores being between 10 and 50 Å and the median diameter of the mesopores being between 50 and 200 Å.

Preferably, such a ceric oxide according to the present invention has a specific surface varying between 150 and 180 m²/g after calcination at a temperature between 350° and 500° C., and more preferably after calcination at a temperature between 400° and 450° C.

The process of the present invention for the preparation of a ceric oxide with a large specific surface and a controlled porosity comprises the stabilizing of an aqueous colloidal dispersion of a cerium (IV) compound by the addition of a base thereto, separating the precipitate which results and subjecting the precipitate to a heat treatment.

The destabilization of the aqueous colloidal dispersion of the cerium (IV) compound is effected by the addition of a base to the aqueous colloidal dispersion of the cerium (IV) compound until a pH higher than 7 is obtained.

It has surprisingly been discovered that the morphological characteristics of the ceric oxide which results depend on the characteristics of the aqueous colloidal dispersion of the cerium (IV) compound, and that the porosity of the ceric oxide obtained may be controlled by varying, in particular, the morphology (i.e., size, geometric form) of the initial colloids and the conditions of destabilization of said colloidal dispersion.

In the following description, the process of obtaining a ceric oxide with a large specific surface by the destabilization of a cerium sol will be initially described, followed by the description of the means used to obtain a ceric oxide with a large specific surface and a uniform or dual population porosity, said means being related to the choice of the characteristics of the initial cerium sol, together with their application.

According to the invention, the process to obtain a ceric oxide with a large specific surface is comprised of a first step of contacting an aqueous colloidal dispersion of a cerium (IV) compound with a base.

In general, the aqueous colloidal dispersions of a compound of cerium (IV) suitable for use correspond to the following general formula (I):

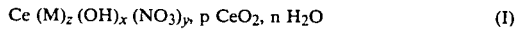

Ce (M)$_z$ (OH)$_x$ (NO$_3$)$_y$, p CeO$_2$, n H$_2$O   (I)

wherein:
M represents an alkaline metal or a quaternary ammonium radical;
z is between 0 and 0.2;
y is between 0 and 1.5;
x is such that x=4−y+z;
p is between 0 and 2.0; and,
n is between 0 and about 20.

The term "sol" hereinafter signifies the aqueous colloidal dispersion of the cerium (IV) compound of Formula (I).

The concentration of the cerium (IV) compound in the sol is not critical. If expressed in CeO$_2$, it is generally between 0.1 and 2.0 moles/liter and preferably between 0.5 and 1 mole/liter.

The proportion of cerium (IV) in the colloidal form is higher than 95%. Preferably, a cerium proportion between 99 and 100% is chosen. The present invention does not exclude a sol in which cerium (IV) is present in the ionic form.

The size of the colloids present in the sol may vary within a rather wide range. Generally, the median hydrodynamic diameter of the colloids, as determined by the quasi-elastic diffusion of light according to the method described by Michael L. McConnell in Analytical Chemistry 53, No. 8 1007 A (1981), can vary between 100 and 2,000 Å.

The basic solution used in the process of the present invention can be, in particular, an aqueous ammonia, sodium or potassium hydroxide solution. Gaseous ammonia can also be used. A solution of ammonia is preferred as the base.

The normality of the basic solution is not a critical factor according to the invention, as it can vary within a wide range. For example, it can vary between 0.1 and 11N. It is preferred to use solutions of a concentration between 5 and 10N.

The quantity of the base added is such that the final pH of the dispersion treated is greater than 7, and preferably greater than or equal to 9 and less than or equal to 10.

As a practical matter, the base is added to the aqueous colloidal dispersion of the cerium (IV) compound, or vice versa. The addition may be effected all at once, gradually or continuously. It is generally carried out under agitation.

Preferably, the base is added to the aqueous colloidal dispersion of the cerium (IV) compound.

The rate of addition of the base to the dispersion is not critical. In general, if the rate is expressed in moles of OH⁻ per mole of cerium (IV) per hour, it will vary between 0.1 and 5, and preferably between 2 and 4.

The mixture is carried out at a temperature preferably lower than 60° C., more preferably lower than ambient temperature, and most preferably between 10° and 25° C.

Upon completion of the addition of the basic solution, the reaction medium may be optionally maintained under agitation for some time in order to carry out the precipitation. The duration of the agitation is not critical, and can vary greatly, e.g., generally between 1 minute and 2 hours.

The second stage of the process comprises separating the precipitate which results. This can be accomplished by conventional solid/liquid separation methods, e.g., filtration, decantation, centrifugation or draining.

This separation is generally carried out at ambient temperatures.

The precipitate separated is optionally subjected to a washing operation in order to eliminate the OH⁻ ions. The washing operation may be effected by means of water or an organic solvent. Aliphatic, cycloaliphatic or aromatic hydrocarbons, aliphatic or cycloaliphatic ketones, or aliphatic or cycloaliphatic alcohols, such as methanol, ethanol, n-propanol, isopropanol, n-butanol, isobutanol, neobutanol, can be used as the solvent. When a washing operation is employed, one or several washings are performed, most often one to three washes.

After washing, the water content of the precipitate is generally between 20 and 80%, and preferably between 20 and 50%.

The product obtained after separation and washing can subsequently be dried in air or under reduced pressure on the order of 1 to 100 mm mercury (133,3322 Pa and 13,332.2 Pa). The drying temperature may vary between ambient temperature and 100° C., and the duration of the drying procedure is not critical, and can range from 2 to 48 hours, and more preferably from 10 to 24 hours.

In the last stage of the process of the present invention, the dried product is calcined at a temperature between 300° C. and 800° C., more preferably between 350° C. and 450° C. It lasts for approximately 30 minutes to 10 hours, and most preferably from 4 to 8 hours.

The lower limit of the temperature range for calcination can vary, and may be lowered further.

The upper limit, however, should generally not be exceeded as it has been found that higher temperatures lower the specific surface of the ceric oxide obtained.

It should be noted that the process of the invention is highly suitable for continuous operation.

As mentioned previously, the morphology of the colloids in the sol induces a certain size distribution in the pores.

Provided herewith are certain examples of sols, which, in accordance with the present invention, are useful in obtaining a ceric oxide with a single mode size distribution of its pores.

As the initial starting materials suitable for the preparation of such a ceric oxide, sols obtained by the suspension in water of a cerium (IV) compound of the following Formula (II) are preferably employed:

$$Ce(OH)_x(NO_3)_y, pCeO_2, nH_2O \qquad (II)$$

wherein:
x is such that $x = 4 - y$;
y is between 0.35 and 1.5;
p is greater than or equal to 0 and less than or equal to 2.0; and
n is greater than or equal to 0 and less than or equal to 20.

The sol has colloid sizes ranging from 100 to 1,000 Å.

By adjusting the pH to about 3.0, coarser colloids may be obtained, the hydrodynamic diameter of which can vary between 300 and 2,000 Å.

Sols with the above cited colloid sizes may be obtained by suspending a cerium (IV) compound of Formula (II) in water, which compound is directly dispersible in water. The compound is dispersed under agitation in an aqueous or slightly acid medium, thereby rendering a sol having a pH between 1 and 2.5.

The cerium (IV) compound of Formula (II) can be prepared by a process which comprises hydrolyzing an aqueous solution of a cerium (IV) salt in an acid medium, separating the precipitate which results, and, optionally, subjecting the precipitate to a heat treatment.

In the first step, the hydrolysis of an aqueous solution of a cerium (IV) salt is performed.

For this purpose, an initial solution of cerium (IV) is used, which may be, for example, an aqueous solution of ceric nitrate. The solution can contain, without detriment, cerium in the cerous state. It is desirable, however, that the solution contain at least 85% cerium (IV) in order to obtain a good precipitation yield.

The cerium salt solution is chosen so that it contains no impurities which could appear in the final product. It is advantageous to use a cerium salt solution with a purity higher than 99%.

The concentration of the cerium salt solution is not a critical factor. If expressed in terms of cerium (IV), it generally varies between 0.3 and 3 moles per liter, and, more preferably, between 0.5 and 1.5 moles/liter.

As a starting material, a ceric nitrate solution obtained by the action of nitric acid on a hydrated ceric oxide prepared in a conventional manner, or a solution prepared by the reaction of a solution of a cerous salt, for example cerous carbonate, with an ammonia solution in the presence of hydrogen peroxide, can be used. A solution of ceric nitrate obtained by the electrolytic oxidation of a solution of cerous nitrate and described in French Patent No. 2,570,087 is the preferred starting material.

The hydrolysis medium comprises water, the nature of which is not critical, but which is preferably distilled or permutated water.

The acidity may be provided by the addition of an inorganic acid. Nitric acid is preferred. A concentrated acid or an acid diluted, for example, to $10^{-2}$N, can be used.

The acidity can also originate in the ceric nitrate solution, which can be slightly acidic and have a normality varying between 0.01N and 5N, and preferably between 0.1N and 1N.

The quantity of $H^+$ ions introduced by the hydrolysis reaction is such that the molar ratio $[H^+]/[Ce^{IV} \text{ eq.}]$ is greater than or equal to 0 and less than or equal to 3.

The choice of the molar ratio $[H^+]/[Ce^{IV} \text{ eq.}]$ depends on the method of using the aqueous solution of the cerium (IV) salt and the hydrolysis medium. It will be discussed in detail subsequently.

The proportion between the aqueous solution of the cerium (IV) salt and the hydrolysis medium (essentially water) is such that the final equivalent concentration of cerium (IV) is between 0.1 and 1.0 mole/liter, and preferably between 0.2 and 0.6 mole/liter.

The final equivalent concentration of cerium (IV) is defined by the following equation:

$$[Ce^{IV}\text{eq.}] = [Ce^{IV}] \times V'/(V + V')$$

wherein:
$[Ce^{IV}]$ is the concentration in moles/liter of the cerium (IV) salt solution.
V represents the volume of water with the optionally added acid; and,
V' is the volume of the cerium (IV) solution.

The hydrolysis of the cerium (IV) salt effected is carried out preferably between 70° C. and 120° C., and most preferably at the reflux temperature of the reaction medium, which is around 100° C. It is easier to work at the reflux temperature, which is readily controlled and reproducible.

The process of the invention can be carried out in accordance with several variations. For example, the addition of the cerium (IV) salt solution may be performed all at once, gradually or continuously, to water optionally containing an acid, and then heated to the reaction temperature, or vice-versa.

The process can also be conducted on a continuous basis. For this, the mixing of the cerium (IV) salt solution and the hydrolysis medium is carried out simultaneously and continuously, with the mixture being heated continuously to the reaction temperature chosen. If the two starting solutions are employed according to the aforementioned embodiments, the molar ratio $[H^+]/[Ce^{IV}\text{ eq.}]$ is greater than or equal to 0 and less than or equal to 3. This ratio is preferably between 0 and 2.0 for reasons of yield.

In accordance with another embodiment of the present invention, the cerium (IV) salt solution and the hydrolysis medium are mixed together, with the mixture being heated to the reaction temperature under agitation.

In this case, the molar ratio $[H^+]/[Ce^{IV} eq.]$ can be chosen to be higher than 0.75 and less than or equal to 3, regardless of the final equivalent concentration of cerium (IV). If the molar ratio $[H^+]/[Ce^{IV} eq.]$ is greater than or equal to 0 and less than or equal to 0.75, the final equivalent concentration of cerium (IV) is greater than or equal to 0.4 mole/liter.

Regardless of the mode of operation, the formation of a precipitate is observed. The reaction time can vary between 2 and 8 hours and most preferably between 3 and 6 hours.

The second step of the process comprises separating the reaction mass, which is in the form of a suspension having a temperature most often between 90° C. and 100° C., by conventional methods. This operation is carried out before or after the cooling of the reaction mass to ambient temperature, e.g., most often between 10° C. and 25° C.

The precipitate can be separated by conventional methods of separation, e.g., filtration, decantation, draining and centrifugation.

The third step of the process comprises carrying out a heat treatment of the separated precipitate.

This operation is optional, as it has been found that the separated precipitate after the first hydrolysis is dispersible in water and that it is possible to obtain an aqueous sol by suspending the separated precipitate directly in water, with drying being unnecessary. In fact, drying is not indispensable as the elimination of all free water is not required.

In this case, the product obtained is of Formula (IIa):

$$Ce(OH)_x (NO_3)_y, nH_2O \quad \text{(IIa)}$$

wherein:
x is such that $x = 4 - y$;
y is between 0.35 and 0.7; and
n is greater than or equal to 0 and less than or equal to about 20.

The cerium (IV) compound defined by Formula (IIa) above corresponds to a compound of Formula (II) in which p is equal to 0 and n is greater than or equal to 0 and less than or equal to about 20.

By drying the separated precipitate under controlled parameters of time and temperature, and upon increasing these parameters, a cerium (IV) compound corresponding to Formula (IIa) in which p is equal to 0 and n is greater than or equal to 0 and less than or equal to about 20, a cerium (IV) compound of Formula (IIb) corresponding to a compound of Formula (II) in which n and p are equal to 0, and a cerium (IV) compound of Formula (IIc) corresponding to a compound of Formula (II) in which n is equal to 0 and p is greater than 0, are obtained.

More precisely, the cerium (IV) compound represented by the general Formula (IIb) is as follows:

$$Ce(OH)_x (NO_3)_y \quad \text{(IIb)}$$

wherein:
x is such that $x = 4 - y$;
y is between 0.35 and 0.7; and
the cerium content expressed in % of $CeO_2$ is between 77 and 72%.

If the conditions of the drying operation are more severe and the $CeO_2$ content exceeds 72% for $y = 0.7$, 77% for $y = 0.35$, and a value ranging between 77 and 72% for a y between 0.35 and 0.7, the compound obtained can be represented by the general Formula (IIc), which shows the presence of ceric oxide, i.e.,:

$$Ce(OH)_x (NO_3)_y, pCeO_2 \quad \text{(IIc)}$$

wherein:
x is such that $x = 4 - y$;
y is between 0.35 and 1.5; and
p is greater than 0 and less than or equal to 2.0.

Drying conditions can vary within wide limits. Thus, the temperature can vary between 15° C. and 100° C., most preferably between ambient temperature and 50° C. The duration of the drying operation is preferably between 5 and 48 hours, to thereby insure a dry product (n = 0). Drying can be carried out in air and/or under a reduced pressure, for example, between 1 and 100 mm mercury (133.3322 Pa and 13332.2 Pa).

Regardless of the degree of hydration of the cerium (IV) compound of Formula (II), a cerium (IV) compound directly dispersible in water is obtained, said compound leading to a sol having colloids with a hydrodynamic diameter between 100 and 1,000 Å when suspended in water.

As examples of sols also leading to a ceric oxide with a uniform pore size distribution, sols may be cited generally having a median hydrodynamic diameter between 300 and 600 Å, and prepared by a process which comprises forming a dispersion of hydrated ceric oxide with water and an acid, in particular nitric acid, with the quantity of acid present in the dispersion being such that the pH is lower than 5.4, and heating the suspension. The initial hydrated ceric oxide is prepared by the reaction of a cerous salt solution, for example, cerous carbonate, and an ammonia solution, in the presence of an oxidizing agent, preferably hydrogen peroxide.

Additional details of the preparation of the sol are obtainable from French Patent No. 2,416,867, which is hereby expressly incorporated by reference.

In the case of the use of the aforedescribed sols to obtain a ceric oxide having a uniform porosity, it has been found that the size of the pores can be related to that of the colloids, and that it increases along with the size of the colloids.

As an illustrative and nonlimiting example, a sol of coarse colloids with a median hydrodynamic diameter equal to 300 Å leads to a ceric oxide of pores varying between 50 Å and 80 Å. Furthermore, a sol with colloids of a median hydrodynamic diameter of 570 Å makes it possible to obtain ceric oxides having pores of about 160 Å.

In accordance with another embodiment of the invention, examples are now given of sols allowing one to obtain a ceric oxide with a large specific surface and a dual population porosity.

The starting material is a sol prepared by suspending in water a compound of Formula (II), which is prepared according to predetermined hydrolysis conditions, separating the precipitate which results, and optionally heat treating the precipitate.

The hydrolysis comprises mixing the cerium (IV) salt solution and the hydrolysis medium, and heating the mixture to the reaction temperature of 70° C. to 120° C., and most preferably to the reflux temperature of the reaction mixture.

The aforedefined characteristics of the initial solutions, the cerium (IV) salt solution and the hydrolysis medium, remain valid.

The quantity of $H^+$ ions introduced for the hydrolysis reaction is such that the molar ratio $[H^+]/[Ce^{IV}eq.]$ is greater than or equal to 0 and less than or equal to 0.75.

The proportion between the aqueous solution of the cerium (IV) and the hydrolysis medium (essentially water) is such that the final equivalent concentration is less than 0.4 mole/liter, and preferably between 0.2 and 0.4 mole/liter.

As a practical matter, the mixing of the two initial solutions is carried out at ambient temperature, with the mixture then being heated to the reaction temperature.

The reaction time can vary between 2 and 8 hours, and preferably between 3 and 6 hours. The formation of a precipitate is observed.

The operations of separation, optional drying and suspension of the cerium (IV) compound in view of obtaining the sol, are carried out as aforedescribed.

A sol having colloids with a median hydrodynamic diameter of 100 to 1,000 Å is obtained.

The ceric oxides obtained after calcination of the aforedescribed sols can be used in numerous applications. In particular, applications as fillers, binders, washcoats, thickeners, dispersants, reinforcing agents, pigments, adsorbing agents and raw materials for the manufacture of ceramics, can be mentioned as examples.

The ceric oxide according to the present invention has a large specific surface and a high porosity. The ceric oxide is suitable for use in the field of catalysis, as a catalyst or as a catalytic support. For example, it may be used as a catalyst or a catalyst support to carry out different reactions such as dehydration, hydrosulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, hydrodecyclization of hydrocarbons or other organic compounds, the reactions of oxidation and/or reduction, the Claus reaction, the treatment of the exhaust gases of internal combustion engines, demetallization, methanation, and shift conversion.

The ceric oxide of the invention may be used by itself or in mixture with other oxides.

Due to its high chemical reactivity, it can be used advantageously in the preparation of mixed catalyst supports, for example, $(Al_2O_3-MgO)-CeO_2$ (see Japanese Application No. 78/40077).

The following examples are given in order to further illustrate the present invention. These examples are purely illustrative and are in no way meant to be limitative. In the examples and specification, unless otherwise stated, all percentages are expressed by weight.

EXAMPLE 1

A. Preparation of a sol of a cerium (IV) compound of Formula (IIc):

In a reactor equipped with a thermometer, an agitator, a system for the introduction of reagents, a cooling apparatus also equipped with a heating device, the following solutions were introduced at ambient temperature:

2,150 cm3 of a 1.02N nitric acid solution; and
850 cm3 of a ceric nitrate solution prepared by electrolysis according to French Patent No. 2,570,087, containing 1.23 moles/liter cerium (IV), 0.05 mole/liter cerium (III) and having a free acidity of 0.49N.

In the hydrolysis medium the cerium (IV) concentration expressed in $CeO_2$ was equal to 60 g/l and the molar ratio $[H^+]/[Ce^{IV}eq.]$ was equal to 2.5.

The reaction medium was maintained under agitation and reflux for 4 hours.

The filtration was carried out on sintered glass (porosity No. 3).

The product obtained was dried in an oven at 40° C. for 48 hours.

59.4 g of a yellow precipitate of a cerium (IV) compound of Formula (IIc) containing 83% $CeO_2$, with a molar ratio $NO_3/Ce^{IV}$ of approximately 0.5, were recovered.

25.9 g of the compound prepared in this manner was added to distilled water used in a quantity sufficient to obtain a volume 250 cm$^3$. A sol having a concentration in $Ce^{IV}$, expressed in $CeO_2$, of 86 g/l (0.5M) was obtained.

Examination by the quasi-elastic diffusion of light showed the presence of colloids with a median hydrodynamic diameter on the order of 310 Å.

B. Preparation of a ceric oxide with a large specific surface and a uniform pore distribution To 250 cm$^3$ of the previously prepared sol, under agitation and at ambient temperature, an 11N ammonia solution was added to obtain a pH of 10 at a rate of 45.5 cm$^3$/h.

The reaction mass was maintained at a pH of 10 for 5 minutes and then a solid/liquid separation was carried out by filtration.

The precipitate recovered was subsequently washed in 250 cm$^3$ distilled water for 15 minutes.

After filtration, the solid collected was dried in an oven at 100° C. for 24 hours.

The precipitate was placed in an alumina boat and calcined in a muffle furnace for 6 hours at 450° C.

The ceric oxide obtained had the following physicochemical properties:
its purity was very high as the weight ratio of $Na_2O/CeO_2$ was less than 100 ppm and the weight ratio of $NO_3/CeO_2$ was less than 0.003%.

The BET porosimetric analysis showed:
a specific surface on the order of 115 m$^2$/g;
a pore volume of approximately 0.23 cm$^3$/g;
a median diameter of the pores on the order of 80 Å; and
a uniform distribution of pore sizes: the standard deviations as determined by the ratios of:

$$(d_{84} \cdot V_p)/(d_{50} V_p) \text{ and } (d_{50} \cdot V_p)/(d_{16} \cdot V_p)$$

being equal to 1.06 and 1.5.

EXAMPLE 2

A. Preparation of a sol of cerium (IV) of Formula (IIa)

1.89 liters of distilled water were introduced at ambient temperature into a reactor equipped with a thermometer, an agitator, a system for the introduction of reagents, and a cooling apparatus also equipped with a heating device.

The temperature of the solution was raised to 100° C. under agitation and in 3 hours, 1.11 liters of a ceric nitrate solution containing 1.26 moles/liter of cerium (IV), 0.05 mole/liter of cerium (III) and having a free acidity of 0.52N, was added.

In the hydrolysis medium, the cerium (IV) concentration expressed in $CeO_2$ was equal to 80 g/l and the molar ratio $[H^+]/[Ce^{IV} eq.]$ was equal to 0.4.

The reaction medium was maintained under agitation and at reflux for 3 hours.

Filtering was carried out on sintered glass (porosity No. 3).

351 g of a cerium (IV) compound of Formula (IIa), containing 57% $CeO_2$, were recovered.

37.7 g of the compound prepared in this manner were added to distilled water employed in a quantity sufficient to obtain a volume of 250 cm$^3$. A sol having a $Ce^{IV}$ concentration, expressed in $CeO_2$, of 86 g/l (0.5M) was obtained.

Examination by the quasi-elastic diffusion of light showed the presence of colloids with a median hydrodynamic diameter on the order of 450 Å.

B. Preparation of a ceric oxide with a large specific surface and a uniform pore distribution To 250 cm$^3$ of the sol prepared previously, under agitation and at ambient temperature, a 11N ammonia solution was added to obtain a pH of 10, at a rate of 45.5 cm$^3$/h.

The reaction mass was maintained at a pH of 10 for 5 minutes, and then a solid/liquid separation was carried out by filtering.

The precipitate recovered was subsequently washed in 250 cm$^3$ distilled water for 15 minutes.

After filtering, the solid collected was dried in an oven for 24 hours at 100° C.

It was then calcined in a muffle furnace for 6 hours at 450° C.

The BET porosimetric analysis of the ceric oxide obtained showed:
a specific surface on the order of 125 m$^2$/g;
a pore volume of approximately 0.22 cm$^3$/g;
a median pore diameter on the order of 75 Å; and
a uniform pore size distribution: the standard deviations as determined by the ratios $(d_{84} \cdot v_p)/(d_{50} \cdot v_p)$ and $(d_{50} \cdot v_p)/(d_{16} \cdot v_p)$ being equal to 1.06 and 1.6.

EXAMPLE 3

A—Preparation of a sol of a cerium (IV) compound of Formula (IIc)

Into the apparatus described in Example 2, at ambient temperature, 2.182 liters of 0.518N nitric acid were introduced.

The temperature of this solution was raised to 100° C. under agitation and over 3 hours, 817.6 cm$^3$ of a ceric nitrate solution containing 1.28 moles/liter of cerium (IV), 0.06 mole/liter cerium (III) and having a free acidity of 0.53N were added.

In the hydrolysis medium, the concentration of cerium (IV) expressed in $CeO_2$ was equal to 60 g/l and the molar ratio $[H^+]/[Ce^{IV} eq.]$ was equal to 1.5. The reaction medium was maintained under agitation and reflux for 3 hours.

Filtration was carried out on sintered glass (porosity No. 3).

The product obtained was dried in an oven at 40° C. for 48 hours.

180 g of a cerium (IV) compound of Formula (IIc) containing 82.6% $CeO_2$, were recovered.

26.03 g of the compound prepared in this manner were added to distilled water employed in a quantity sufficient to obtain a volume of 250 cm$^3$. A sol with a $Ce^{IV}$ concentration, expressed in $CeO_2$, of 86 g/l (0.5M) was obtained.

Examination by the quasi-elastic diffusion of light showed the presence of colloids with a median hydrodynamic diameter on the order of 470 Å.

B—Preparation of a ceric oxide with a large specific surface and a uniform pore distribution To 250 cm$^3$ of the sol previously prepared, under agitation and at ambient temperature, a 5.5N ammonia solution was added to obtain a pH of 10, at a rate of 91 cm$^3$/h.

The reaction mass was maintained at a pH of 10 for 5 minutes, and subsequently a solid/liquid separation was effected by filtration.

After filtration, the solid collected was dried in an oven at 100° C. for 24 hours.

It was then calcined in a muffle furnace for 6 hours at 450° C.

The BET porosimetric analysis of the ceric oxide obtained showed:
a specific surface on the order of 110 m$^2$/g;
a pore volume of approximately 0.22 cm$^3$/g;
a median pore diameter on the order of 140 Å; and
a uniform pore size distribution: the standard deviations as determined by the ratios of $(d_{84} \cdot v_p)/(d_{50} \cdot v_p)$ and $(d_{50} \cdot v_p)/(d_{16} \cdot v_p)$ being equal to 1.14 and 1.22.

EXAMPLE 4

A—Preparation of a sol of a cerium (IV) compound of Formula (IIc)

Into the apparatus described in Example 2, at ambient temperature, 2.455 liters of a 0.59N nitric acid solution were introduced.

The temperature of the solution was raised to 100° C. under agitation and over 3 hours, 545 cm$^3$ of a ceric nitrate solution containing 1.28 moles/liter of cerium (IV), 0.06 mole/liter cerium (III) and having a free acidity of 0.53N, were added.

In the hydrolysis medium the concentration of cerium (IV) expressed in $CeO_2$ was equal to 40 g/l and the molar ratio $[H^+]/[Ce^{IV} eq]$ was equal to 2.5.

The reaction medium was maintained under agitation and at reflux for 3 hours.

Filtration was carried out on sintered glass (porosity No. 3).

The product obtained was dried in an oven at 40° C. for 48 hours.

133.6 g of a cerium (IV) compound corresponding to Formula (IIc) and containing 83% $CeO_2$, were recovered.

25.9 g of the compound prepared in this manner were added to distilled water employed in a quantity sufficient to obtain a volume of 250 cm$^3$. A sol with a $Ce^{IV}$ concentration, expressed in $CeO_2$, of 86 g/l (0.5M) was obtained.

Examination by the quasi-elastic diffusion of light showed the presence of colloids with a median hydrodynamic diameter on the order of 570 Å.

B—Preparation of ceric oxide with a large specific surface and with a uniform pore distribution To 250 cm$^3$ of the sol prepared previously, under agitation and at ambient temperature, an 11N ammonia solution was added to obtain a pH of 10, at a rate of 22.5 cm$^3$/h.

The reaction mass was maintained at a pH of 10 for 5 minutes, then a solid/liquid separation was carried out by filtration.

After filtering, the solid collected was dried in an oven at 100° C. for 24 hours.

It was then calcined in a muffle furnace for 6 hours at 450° C.

The BET porosimetric analysis of the ceric oxide obtained showed:
a specific surface on the order of 110 m$^2$/g;
a pore volume of approximately 0.26 cm$^3$/g;
a median diameter of the pores on the order of 160 Å; and
a uniform pore size distribution: the standard deviation as determined by the ratios of $(d_{84} \cdot v_p)/(d_{50} \cdot v_p)$ and $(d_{50} \cdot v_p)/(d_{16} \cdot v_p)$ being equal to 1.13 and 1.45.

EXAMPLE 5

A—Preparation of a sol of the cerium (IV) compound of Formula (I)

The following was introduced into a reactor:
300 g of a hydrated ceric oxide prepared by precipitation with ammonia of a cerous nitrate solution in the presence of hydrogen peroxide and containing 71.6% CeO$_2$.
43 cm3 7.5N nitric acid added to 475 cm$^3$ water.

The reaction mass wa maintained for 20 minutes at 70° C. and then a solid/liquid separation was carried out by centrifugation at 3,000 rpm for 15 minutes.

After the elimination of the supernatant, 1.18 liters of water were added.

After agitation, a sol with 172 g/l in CeO$_2$ (1M) was obtained.

Examination by the quasi-elastic diffusion of light showed the presence of colloids with a median hydrodynamic diameter on the order of 450 Å.

B—Preparation of a ceric oxide with a large specific surface and a uniform pore distribution To 250 cm$^3$ of the sol previously prepared, under agitation and at ambient temperature, a 10.8N ammonia solution was added to obtain a pH of 10, at a rate of 100 cm$^3$/h.

The reaction mass was maintained at a pH of 10 for 5 minutes and then a solid/liquid separation was carried out by filtration.

The precipitate recovered was then washed in 250 cm$^3$ distilled water for 15 minutes.

After filtering, the solid collected was dried in an oven at 100° C. for 24 hours.

It was then calcined in a muffle furnace for 6 hours at 450° C.

The BET porosimetric analysis of the ceric oxide obtained showed:
a specific surface on the order of 125 m$^2$/g;
a pore volume of approximately 0.175 cm$^3$/g;
a median diameter of the pores on the order of 50 Å; and
a homogeneous pore size distribution: the standard deviations as determined by the ratios $(d_{84} \cdot v_p)/(d_{50} \cdot v_p)$ and $(d_{50} \cdot v_p)/(d_{16} \cdot v_p)$ being equal to 1.2 and 1.4.

EXAMPLE 6

A—Preparation of a sol of a cerium (IV) compound of Formula (IIc)

Into a reactor equipped with a thermometer, an agitator, a system for the introduction of reagents, a reflux condenser equipped with a heating device, at ambient temperature, the following were introduced:
2,440 cm$^3$ distilled water, and
558 cm$^3$ of a ceric nitrate solution containing 1.25 moles/liter cerium (IV) 0.05 mole/liter cerium (III) and having a free acidity of 0.5N.

In the hydrolysis medium, the concentration of cerium (IV) expressed in CeO$_2$ was equal to 40 g/l and the molar ratio $[H^+]/[Ce^{IV} eq.]$ was equal to 0.4.

The reaction medium was maintained under agitation and at reflux for 4 hours.

Filtration was carried out on sintered glass (porosity No. 3).

The product obtained was dried in an oven at 40° C. for 48 hours.

147 g of a yellow precipitate with 80% CeO$_2$ were collected.

26.9 g of the compound prepared in this manner were added to distilled water used in a quantity sufficient to obtain a volume of 250 cm$^3$. A sol with a cerium (IV) concentration, expressed in CeO$_2$, of 86 g/l (0.5M), was obtained.

Examination by the quasi-elastic diffusion of light showed the presence of colloids with a median hydrodynamic diameter on the order of 900 Å.

B—Preparation of ceric oxide with a large specific surface and a dual population porosity To 250 cm$^3$ of the sol previously prepared, under agitation and at ambient temperature, an 11N ammonia solution was added to obtain a pH of 10, at a rate of 45.5 cm$^3$/h.

The reaction medium was maintained at a pH of 10 for 5 minutes and then a solid/liquid separation was carried out by filtration.

The precipitate recovered was subsequently washed in 250 cm$^3$ distilled water for 15 minutes.

After filtering, the solid collected was dried in an oven at 100° C. for 24 hours.

It was then calcined in a muffle furnace for 6 hours at 450° C.

The BET porosimetric analysis of the ceric oxide obtained showed:
a specific surface on the order of 150 m$^2$/g;
a pore volume of approximately 0.25 cm$^3$/g;
a dual distribution of pores;
a presence of micropores with a median diameter of approximately 15 Å; and
a presence of mesopores with a median diameter of approximately 100 Å.

EXAMPLE 7

A—Preparation of a sol of a cerium (IV) compound of Formula (IIc)

At ambient temperature, the following were introduced into the apparatus described in Example 6:
2,182 cm³ distilled water, and
817 cm³ of a nitric acid solution containing 1.28 moles/liter cerium IV, 0.06 mole/liter cerium III and having a free acidity of 0.5N.

In the hydrolysis medium the cerium (IV) concentration expressed in $CeO_2$ was equal to 60 g/l and the molar ratio $[H^+]/[Ce^{IV} eq.]$ was equal to 4.

The reaction medium was maintained under agitation and at reflux for 4 hours.

The product was filtered and dried as in Example 6.

213 g of a yellow precipitate containing 80.3% $CeO_2$ were recovered.

26.77 g of the compound prepared in this manner were added to distilled water used in a quantity sufficient to obtain a volume of 250 cm³. A sol with a cerium (IV) concentration, expressed in $CeO_2$, of 86 g/l (0.5M) was obtained.

Examination by the quasi-elastic diffusion of light showed the presence of colloids with a median hydrodynamic diameter on the order of 750 Å.

B—Preparation of a ceric oxide with a large specific surface and a dual population porosity To 250 cm³ of the sol prepared previously, under agitation and at ambient temperature, an 11N ammonia solution was added to obtain a pH of 10, at a rate of 45.5 cm³/h.

The reaction medium was maintained at a pH of 10 for 5 minutes and then a solid/liquid separation was carried out by filtering.

Subsequently, the precipitate recovered was washed in 250 cm³ distilled water for 15 minutes.

After filtering, the solids collected were dried in an oven at 100° C. for 24 hours.

They were then calcined in a muffle furnace for 6 hours at 450° C.

The BET porosimetric analysis of the ceric oxide obtained showed:
a specific surface on the order of 175 m²/g;
a pore volume of approximately 0.160 cm³/g;
a dual pore distribution;
a presence of micropores with a median diameter of approximately 12 Å representing a pore volume of 0.05 cm³/g; and
a presence of mesopores with a median diameter of 120 Å, representing a pore volume of 0.11 cm³/g.

EXAMPLE 8

A—Preparation of a sol of a cerium (IV) compound of Formula (IIc)

At ambient temperature, the following were introduced into the apparatus described in Example 6:
1,984 cm³ distilled water and
1,016 cm³ of nitric acid solution containing 1.25 moles/liter cerium (IV) 0.05 mole/liter cerium (III) and having a free acidity of 0.5N.

In the hydrolysis medium, the cerium (IV) concentration expressed in $CeO_2$ was equal to 80 g/l and the molar ratio $[H^+]/[Ce^{IV} eq.]$ was equal to 0.4.

The reaction medium was maintained under agitation and at reflux for 4 hours.

The product obtained was filtered and dried as in Example 6.

228 g of a yellow precipitate containing 82% $CeO_2$ were collected.

26.18 g of the compound prepared in this manner were added to distilled water employed in a quantity sufficient to obtain a volume of 250 cm³. A sol with a cerium (IV) concentration expressed in $CeO_2$ of 86 g/l (0.5M) was obtained.

Examination of the sol obtained by the quasielastic diffusion of light showed the presence of colloids with a median hydrodynamic diameter on the order of 650 Å.

B—Preparation of ceric oxide with a large specific surface and a uniform pore distribution To 250 cm³ of the sol previously prepared, under agitation and at ambient temperature, an 11N ammonia solution was added to obtain a pH of 10, at a rate of 45.5 cm³/h.

The reaction mass was maintained at a pH of 10 for 5 minutes, and then a solid/liquid separation was carried out by filtration.

Subsequently, the precipitate recovered was washed in 250 cm³ distilled water for 15 minutes.

After filtering, the solids collected were dried in an oven at 100° C. for 24 hours.

They were then calcined in a muffle furnace for 6 hours at 450° C.

The BET porosimetric analysis of the ceric oxide obtained showed:
a specific surface on the order of 100 m²/g;
a pore volume of approximately 0.20 cm³/g;
a median pore diameter on the order of 85 Å; and
a uniform distribution of the pores: the standard deviations as determined by the ratios $$(d_{84} \cdot v_p)/(d_{50} \cdot v_p) \text{ and } (d_{50} \cdot v_p)/(d_{16} \cdot v_p)$$

being equal to 2.94 and 8.5.

EXAMPLE 9

A—Preparation of a sol of a cerium (IV) compound of Formula (IIa)

Into a 2 liter three-necked flask equipped with a thermometer, an agitator, a system for the introduction of reagents, a reflux condenser and further equipped with a heating device, the following were introduced at ambient temperature:
1,425 cm³ of distilled water, and
558 cm³ of a nitric acid solution containing 1.24 moles/liter cerium (IV), 0.06 mole/liter cerium (III) and having a free acidity of 0.8N.

In the hydrolysis medium, the concentration in cerium (IV), expressed in $CeO_2$, was equal to 60 g/liter and the molar ratio $H^+/Ce^{IV}$ was equal to 0.64.

The reaction medium was maintained under agitation and at reflux for 4 hours.

Filtration was carried out on sintered glass (porosity No. 3) in a thin layer (less than 5 mm) and under reduced pressure (160 mm mercury) and the filter cake was compressed to the maximum to assure vigorous drainag 157 g of a yellow precipitate of a cerium (IV) compound of Formula (IIa) containing 72.5% $CeO_2$, a molar ratio $NO_3/Ce^{IV}$ of approximately 0.45, were collected.

27.6 g cf the compound prepared in this manner were added to distilled water employed in a quantity sufficient to obtain a volume of 250 cm$^3$. A sol with a cerium (IV) concentration, expressed in CeO$_2$, of 80 g/l was obtained.

Examination by the quasi-elastic diffusion of light showed the presence of colloids with a median hydrodynamic diameter on the order of 600 Å.

B—Preparation of a ceric oxide with a large specific surface and a dual population porosity To 250 cm$^3$ of the sol previously prepared, under agitation and at ambient temperature, 7.3 cm$^3$ of an 11N ammonia solution was added to obtain a pH of 9.5, at a rate of 45 cm$^3$/h.

The reaction medium was maintained at a pH of 9.5 for 5 minutes, then a solid/liquid separation was carried out by filtering.

The precipitate recovered was subsequently washed in 250 cm$^3$ distilled water for 15 minutes.

After filtration, the solid collected was dried in an oven at 100° C. for 24 hours.

It was then calcined in a muffle furnace for 6 hours at 300° C.

The BET porosimetric analysis of the ceric oxide obtained showed:
a specific surface of 175 m$^2$/g;
a pore volume of approximately 0.24 cm$^3$/g;
a dual distribution of pores;
a presence of micropores with a median diameter of approximately 15 Å; and
a presence of mesopores of a median diameter of approximately 100 Å.

EXAMPLE 10

A—Preparation of a sol of a cerium (IV) compound of Formula (IIB)

Example 9 was repeated with the only difference being that over 3 hours 558 cm$^3$ of said ceric nitrate solution were introduced in 1,425 cm$^3$ water previously heated to 100° C.

In the hydrolysis medium, the cerium (IV) concentration expressed in CeO$_2$ was equal to 60 g/liter and the molar ratio H+/Ce$^{IV}$ was equal to 0.64.

The reaction medium was maintained under agitation for 3 hours.

Filtration was carried out on sintered glass (porosity No. 3) in a thin layer (less than 5 mm) and under reduced pressure (160 mm mercury) and the filter cake was compressed to the maximum to assure vigorous drainage.

The product obtained was dried at 20° C. for 15 hours.

14.6 g of a yellow precipitate of a cerium (IV) compound of Formula (IIb) containing 76.6% and a molar ratio of NO$_3$-/Ce$^{IV}$ of 0.37, were collected.

26.1 g of the compound prepared in this manner were added to distilled water in a quantity sufficient to achieve a volume of 250 cm$^3$. A sol with a cerium (IV) concentration, expressed in CeO$_2$, of 80 g/l was obtained.

Examination by the quasi-elastic diffusion of light showed the presence of colloids with a median hydrodynamic diameter on the order of 200 Å.

B—Preparation of a ceric oxide with a large specific surface and a uniform porosity To 250 cm$^3$ of the sol previously prepared, under agitation and at ambient temperature, 7.3 cm$^3$ of an 11N ammonia solution were added to obtain a pH of 9.5 at a rate of 45 cm$^3$/h.

The reaction mass was maintained at a pH of 9.5 for 5 minutes and then a solid/liquid separation was carried out by filtration.

The precipitate recovered was subsequently washed in 250 cm$^3$ distilled water for 15 minutes.

After filtering, the solid collected was dried in an oven at 100° C. for 24 hours.

It was then calcined in a muffle furnace for 6 hours at 300° C.

The BET porosimetric analysis of the ceric oxide obtained showed:
a specific surface of 165 m$^2$/g;
a pore volume of approximately 0.23 cm$^3$/g;
a median diameter of the pores of 75 Å; and
a uniform pore size distribution: the standard deviations as determined by the ratios $(d_{84} \cdot v_p)/(d_{50} \cdot v_p)$ and $(d_{50} \cdot v_p)/(d_{16} \cdot v_p)$ being equal to 1.20 and 1.35.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A ceric oxide which after calcination at a temperature in the range of from 350° to 550+ C. has a specific surface of at least 85 m$^2$/g, a pore volume of at least 0.15 cm$^3$/g, and a median pore diameter greater than 50 Å.

2. The ceric oxide of claim 1, wherein the specific surface is at least 100 m$^2$/g after calcination at a temperature in the range of from 350° to 500° C.

3. The ceric oxide of claim 1, having a pore volume in the range of from 0.15 to 0.3 cm$^3$/g.

4. The ceric oxide of claim 1, having a purity greater than 99%.

5. The ceric oxide of claim 1, wherein the pore volume is greater than 0.15 cm$^3$/g, the median diameter of the pores is between 50 and 200 Å, and the ceric oxide has a monomodal pore distribution.

6. The ceric oxide of claim 5, having a specific surface of 100 to 150 m$^2$/g after calcination at a temperature in the range of from 350° to 500° C.

7. The ceric oxide of claim 6, having a specific surface of 100 to 150 m$^2$/g after calcination at a temperature in the range of from 400° to 450° C.

8. The ceric oxide of claim 5, wherein the median pore diameter is in the range of from 80 to 150 Å.

9. The ceric oxide of claim 5, having a uniform pore distribution, with the standard deviations e1 and e$_2$ being in the range of from 1.0 to 2.0.

10. The ceric oxide of claim 1, having a dual population pore distribution, with the median diameter of the micropores being in the range of from 10 to 50 Å and the median diameter of the mesopores being in the range of from 50 to 200 Å.

11. The ceric oxide of claim 10, wherein the specific surface is in the range of from 150 to 180 m$^2$/g after calcination at a temperature in the range of from 350° to 500° C.

12. The ceric oxide of claim 11, wherein the specific surface is in the range of from 150 to 180 m$^2$/g after calcination at a temperature in the range of from 400° to 450° C.

13. A process for the preparation of the ceric oxide of claim 1 and for calcining the ceric oxide, wherein the process comprises (i) destabilizing an aqueous colloidal dispersion of a cerium (IV) compound by combination with a base, (ii) separating the precipitate which results, (iii) drying the ceric oxide by subjecting it to a heat treatment, and (iv) calcining the ceric oxide.

14. The process of claim 13, wherein the aqueous colloidal dispersion of the cerium (IV) compound employed has the general Formula (I):

$$\text{Ce (M)}_z \text{(OH)}_x \text{(NO}_3\text{)}_y, \, p\text{CeO}_2, \, n\text{H}_2\text{O} \qquad \text{(I)}$$

wherein:
M represents an alkaline metal or a quaternary ammonium radical;
z ranges from 0 to 0.2;
y ranges from 0 to 1.5;
x is such that $x = 4 - y + z$;
p ranges from 0 to 2.0; and
n ranges from 0 to about 20.

15. The process of claim 14, wherein the concentration of the cerium (IV) compound in the colloidal dispersion is in the range of from 0.1 to 2.0 mole/liter.

16. The process of claim 15, wherein the concentration of the cerium (IV) compound in the colloidal dispersion is in the range of from 0.5 to 1 mole/liter.

17. The process of claim 14, wherein the proportion of cerium in colloidal form in said dispersion ranges from 99 to 100%.

18. The process of claim 14, wherein the colloids of the colloidal dispersion have a median hydrodynamic diameter ranging from 100 to 2,000 Å.

19. The process of claim 13, wherein the normality of the basic solution employed ranges from 0.1 to 11N.

20. The process of claim 19, wherein said normality range from 5 to 10N.

21. The process of claim 13, wherein the quantity of the base employed is such that the final pH of the dispersion is greater than 7.

22. The process of claim 21, wherein the final pH of the dispersion is greater than or equal to 9 and less than or equal to 10.

23. The process of claim 13, wherein the base is added to the aqueous colloidal dispersion of the cerium (IV) compound.

24. The process of claim 13, wherein the aqueous colloidal dispersion of the cerium (IV) compound is added to the base.

25. The process of claim 13, wherein the rate of addition of the base to the aqueous colloidal dispersion of the cerium (IV) compound ranges from 0.1 to 5 moles of OH$^-$ per mole of cerium (IV) per hour.

26. The process of claim 13, wherein the temperature of the mixture of the base and dispersion ranges from ambient temperature to about 60° C.

27. The process of claim 13, wherein the reaction medium is further maintained under agitation for a period of time ranging from 1 minute to 24 hours.

28. The process of claim 13, wherein the separation is carried out by filtration, decantation, centrifugation or drainage.

29. The process of claim 13, wherein the precipitate is washed with water or an organic solvent.

30. The process of claim 13, wherein the heat treatment is carried out in air or under reduced pressure on the order of 1 to 100 mm mercury, at a temperature ranging from ambient to 100° C., and for a period of time ranging from 2 to 48 hours.

31. A process for the preparation of a calcined ceric oxide comprising calcining the product produced by the process of claim 13 at a temperature ranging from 300° to 800° C. for a period of time ranging from 30 minutes to 10 hours.

32. The process of claim 31, wherein the calcination temperature ranges from 350° to 450° C.

33. The process of claim 31, wherein the duration of the calcination ranges from 4 to 8 hours.

34. A process for the preparation of the ceric oxide of claim 5, the process comprising (i) destabilizing an aqueous colloidal dispersion of a cerium (IV) compound by the addition of base thereto, (ii) separating the precipitate resulting therefrom, and (iii) calcining the separated precipitate, with said dispersion having been dispersed by a suspension in water of a cerium (IV) compound of the general Formula (II):

$$\text{Ce (OH)}_x \text{(NO}_3\text{)}_y, \, p\text{CeO}_2, \, n\text{H}_2\text{O} \qquad \text{(II)}$$

wherein:
x is such that $x = 4 - y$;
y ranges from 0.35 to 1.5;
p is greater than or equal to 0 and less than or equal to 2.0; and
n is greater than or equal to 0 and less than or equal to about 20;
with the cerium (IV) compound having been prepared by a process which comprises (i) hydrolyzing an aqueous solution of a cerium (IV) salt in an acid medium wherein the molar ratio $[H^+]/[Ce^{IV}\text{eq.}]$ is greater than or equal to 0 and less than or equal to 3; and (ii) separating the precipitate resulting therefrom.

35. The process of claim 34, wherein the cerium (IV) compound is obtained by a process which further comprises (iii) drying the precipitate by heat treating the separated precipitate.

36. The process of claim 34, wherein the hydrolysis (i), the mixing of the solution of the cerium (IV) salt and the hydrolysis medium is carried out simultaneously and continuously, the mixture is heated continuously to a temperature effective for hydrolysis, and the molar ratio $[H^+]/[Ce^{IV}\text{eq.}]$ is greater than or equal to 0 and less than or equal to 3.

37. The process of claim 34, wherein the molar ratio $[H^+]/[Ce^{IV}\text{eq.}]$ ranges from 0 to about 2.0.

38. The process of claim 34, wherein the hydrolysis (i), the solution of the cerium (IV) salt and the hydrolysis medium are initially mixed together under agitation and then heated to a temperature effective for hydrolysis, with the molar ratio $[H^+]/[Ce^{IV}\text{eq.}]$ being greater than 0.75 and less than or equal to 3, regardless of the final concentration of cerium (IV), or the molar ratio of $[H^+]/[Ce^{IV}\text{eq.}]$ is greater than or equal to 0 and less than or equal to 0.75 if the final equivalent concentration of cerium (IV) is greater than or equal to 0.4 mole/liter.

39. A process for the preparation of the ceric oxide of claim 10, the process comprising (i) destabilizing an aqueous colloidal dispersion of the cerium (IV) compound by the addition of a base thereto, (ii) separating the precipitate resulting therefrom, and (iii) calcining the separated precipitate, with the dispersion being prepared by a suspension in water of a cerium (IV) compound of the general Formula (II):

$$Ce(OH)_x(NO_3)_y \cdot pCeO_2 \cdot nH_2O \qquad (II)$$

wherein:

x is such that $x = 4 - y$;

y ranges from 0.35 to 1.5;

p is greater than or equal to 0 and less than equal to 2.0; and n is greater than or equal to 0 and less than or equal to about 20;

with the cerium (IV) compound having been prepared by a process which comprises (i) hydrolyzing an aqueous solution of a cerium (IV) salt in an acid medium, with the solution of the cerium (IV) salt and the hydrolysis medium being mixed under agitation and then heated to the reaction temperature, with the molar ratio $[H+]/[Ce^{IV}eq.]$ being greater than or equal to 0 and less than o equal to 0.75 and the final equivalent concentration of cerium (IV) being less than 0.4 mole/liter, and (ii) separating the precipitate resulting therefrom.

40. The process of claim 39, wherein the precipitate separated in (ii) is subjected to a heat treatment to dry the precipitate.

41. The process of claim 39, wherein the proportion of the aqueous solution of cerium (IV) salt and the hydrolysis medium is such that the final equivalent concentration of cerium (IV) ranges from 0.2 to 0.4 mole/liter.

42. The process of claim 34, wherein the aqueous solution of the cerium (IV) salt is an aqueous solution of ceric nitrate.

43. The process of claim 39, wherein the aqueous solution of the cerium (IV) salt is an aqueous solution of ceric nitrate.

44. The process of claim 34, wherein the acidity is introduced with nitric acid.

45. The process of claim 34, wherein the temperature of the hydrolysis medium ranges from about 70° to about 120° C.

46. The process of claim 39, wherein the temperature of the hydrolysis medium ranges from about 70° to about 120° C.

47. The process of claim 42, wherein the precipitate obtained after hydrolysis is separated and dried at a in the rang from 15° C. to 100° C.

48. The process of claim 47, wherein the temperature ranges from ambient temperature to about 50° C.

49. A calcined ceric oxide having a specific surface of at least 85 $m^2/g$, a pore volume of at least 0.15 $cm^3/g$, and a median pore diameter greater than 50 Å.

* * * * *